United States Patent [19]

Scapes et al.

[11] 4,129,284
[45] Dec. 12, 1978

[54] METERING VALVE

[75] Inventors: John N. Scapes, Schaumburg; Donald R. Speckmann, Mount Prospect, both of Ill.

[73] Assignee: Gould Inc., Rolling Meadows, Ill.

[21] Appl. No.: 771,164

[22] Filed: Feb. 23, 1977

[51] Int. Cl.² .................................................. F16K 1/52
[52] U.S. Cl. ..................................... 251/205; 251/278; 251/334; 138/46
[58] Field of Search ............... 251/205, 334, 276, 278; 137/269; 138/46, 45 A

[56] References Cited

U.S. PATENT DOCUMENTS

| 745,027 | 11/1903 | Stone | 251/278 |
|---|---|---|---|
| 1,998,074 | 4/1935 | Childress | 138/45 A |
| 2,236,013 | 3/1941 | Smith | 138/46 |
| 3,642,026 | 2/1972 | Sielaff | 138/46 X |
| 3,733,048 | 5/1973 | Hiszanski | 251/205 |
| 3,741,242 | 6/1973 | Hansen et al. | 137/269 X |

Primary Examiner—Arnold Rosenthal
Attorney, Agent, or Firm—Wegner, Stellman, McCord, Wiles & Wood

[57] ABSTRACT

A metering valve having a deflectible beam for controlling fluid flow through an inlet port wherein a selected orifice disc, which may be any one of a plurality of orifice discs having different size orifices, is disposed in aligned relationship with the inlet. The deflectible beam may be carried on the orifice disc. The orifice disc may be removably secured within the valve by separable portions of the wall structure thereof. The outlet may be arranged to extend around the periphery of the orifice disc and opens to the flow chamber within the valve closely adjacent the beam to provide effective minimum axial extent of the valve. The beam deflecting structure includes a spring. One spring retainer at an outer end thereof is provided with a conical surface engaging a threaded adjusting element for minimum transfer of rotational force to the spring during the adjustment of the metering valve. The other spring retainer may be fully cylindrical for improved sliding action with a complementary cylindrical portion of the valve flow chamber.

17 Claims, 3 Drawing Figures

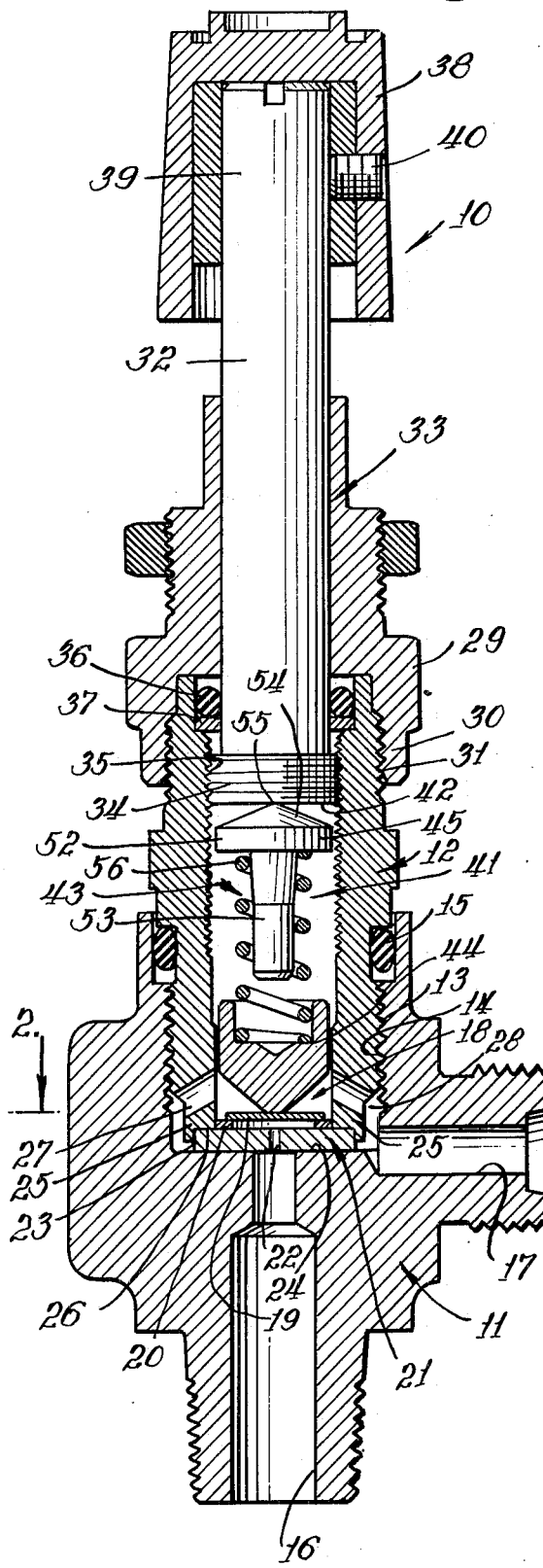

METERING VALVE

BACKGROUND OF THE INVENTION

1. Field of the Invention

This invention relates to metering valves and in particular to deflectible beam-type metering valves.

2. Description of the Prior Art

In U.S. Pat. No. 3,733,048, of Jan. A. Hiszpanski, which patent is owned by the assignee hereof, a fine metering valve is disclosed having a deflectible beam and means for deflecting the beam adjustably adjacent a valve port for metering the fluid flow through the valve.

Deflection of the beam is effected in the Hiszpanski patent by a displacement reduction means which includes a spring extending between a threaded member and a seat engaging the beam. As the spring is resiliently compressible, a threaded advance of the threaded member provides a reduced displacement for fine control of the deflection of the beam.

SUMMARY OF THE INVENTION

The present invention comprehends a metering valve construction comprising a further improvement over that of the above described Hiszpanski metering valve.

One improved feature of the present metering valve is the provision therein of a removable orifice disc aligned with the inlet to define the inlet port underlying the deflectible beam. The orifice disc may be any one of a plurality of orifice discs having different size orifices. The invention comprehends the utilization of the same deflectible beam with any one of the selected orifice discs, as desired.

The orifice disc may be retained in the valve by a clamping of a peripheral portion thereof between separable portions of the wall means of the valve. In the illustrated embodiment, the separable wall portions comprise the valve body and bonnet portions of the valve. More specifically, in the illustrated embodiment, the peripheral portion of the orifice disc is clamped between the inner end of the bonnet and an inner surface of the valve body defining a portion of the inner valve chamber.

The invention further comprehends the arrangement of the outlet to extend around the periphery of the orifice disc for effectively minimizing the axial extent of the valve. Thus, the outlet may include a duct portion extending through the bonnet adjacent the beam to an annular space defined cooperatively by the body, bonnet, and peripheral portion of the orifice disc. The annular space, in turn, may open to a duct portion through the valve body opening to exteriorly of the valve.

The deflectible beam may be carried on a suitable spacer ring supported on the orifice disc.

The force applying means for effecting the desired deflection of the beam may include a threaded stem adjustably threaded to the bonnet for selective movement of an inner end surface thereof toward and from the deflectible beam. Force is transferred from the threaded stem to the deflectible beam by a displacement reduction means including a coil spring. A first spring retainer receives one end of the spring adjacent the deflectible beam and defines a frustoconical surface, the tip of which engages the beam under the biasing action of the spring. The outer periphery of the spring retainer may be cylindrical for accurate sliding engagement in a cylindrical portion of the bonnet outwardly of the outlet port.

The other end of the spring is provided with a second spring retainer. The second spring retainer may comprise a mushroom element having a conical outer surface on the head portion thereof arranged to have point contact with the threaded stem so as to effectively minimize rotational force transmission between the threaded stem and the second spring retainer. The second spring retainer may further include a stem portion received in the outer end of the spring. Resultingly, threaded movement of the stem in the bonnet effects selectively a contraction or expansion of the coil spring between the opposite spring retainers to effect the desired displacement reduction deflection of the beam.

The metering valve of the present invention is extremely simple and economical of construction while yet providing the highly desirable advantages discussed above.

BRIEF DESCRIPTION OF THE DRAWING

Other features and advantages of the invention will be apparent from the following description taken in connection with the accompanying drawing wherein:

FIG. 1 is a vertical section of a metering valve embodying the invention;

FIG. 2 is a transverse section thereof taken substantially along the line 2—2 of FIG. 1; and FIG. 3 is a fragmentary vertical section illustrating the arrangement of the valve with the beam in a deflected position.

DESCRIPTION OF THE PREFERRED EMBODIMENT

In the exemplary embodiment of the invention as disclosed in the drawing, a metering valve generally designated 10 is shown to comprise a body generally designated 11 and a bonnet generally designated 12. The bonnet is removably threaded to the body by means of a threaded lower portion 13 on the bonnet, and a threaded recess 14 in the body. A suitable O-ring 15 may be provided for sealing the bonnet to the body in assembled relationship.

Body 11 further defines an inlet duct 16 and an outlet duct 17. The body and bonnet cooperatively define an inner flow chamber 18 providing communication between the inlet 16 and the outlet 17.

Metering of flow through the valve 10 is effected herein by a deflectible beam 19 which is juxtaposed to the inlet 16 within the flow chamber 18, as shown in FIG. 1. In the illustrated embodiment, the beam is supported on an annular support 20 which illustratively may comprise a spacer ring, and which, in turn, is carried on an orifice disc 21. The orifice disc is provided with an axial port 22 which effectively defines an inlet port to flow chamber 18 in the assembled arrangement of the valve as shown in FIG. 1.

Orifice disc 21 further defines a peripheral portion 23 which is sealingly clamped between a flat surface 24 of body 11 defining a portion of the wall of flow chamber 18, and the lower end 25 of the bonnet which may be provided with a suitable annular recess 26 for receiving the disc peripheral portion 23 and thereby centering port 22 in axial alignment with inlet duct 16 of the body.

Bonnet 12 further defines a pair of ducts 27 opening to an outer annular recess 28, in turn communicating with body outlet duct 17, as best seen in FIG. 2.

As shown in FIG. 1, the peripheral portion 23 of orifice disc 21 cooperates with the lower end 25 of the bonnet and the portion of body 11 surrounding the inner end of outlet duct 17 to define the annular space 28 for conducting fluid from the bonnet outlet ducts 27 to the body outlet duct 17.

The upper end of the bonnet may be closed by a suitable cap 29 having an internally threaded portion 30 threadedly mounted to an externally threaded portion 31 of the bonnet. Extending through the cap is the stem portion 32 of a force member generally designated 33 having a lower threaded portion 34 threaded into a threaded recess 35 in the upper portion of the bonnet. The stem 32 is rotatably sealed to the bonnet by means of an O-ring 36 and washer 37 mounted about the stem above the threaded portion 34.

An operating knob 38 is secured to the distal end 39 of the stem portion 32 by a suitable set screw 40.

A displacement reduction means generally designated 41 is interposed between the lower surface 42 of stem portion 34 and beam 19. The displacement reduction means functions to deflect the beam a small amount for a given amount of axial movement of the force member 33, and for this purpose, includes a coil spring 43, a first spring seat retainer 44, and a second spring seat retainer 45.

As best seen in FIG. 3, spring seat retainer 44 is defined by a lower frustoconical surface 46 having a lower end 47 engaging the midportion of beam 19. Retainer 44 further defines a cylindrical sidewall 48 slidably received in a cylindrical bore portion 49 of bonnet 12 opening to chamber 18. The lower end 50 of spring 43 is received in a cylindrical recess 51 of the retainer 44 opening oppositely to end, or tip, 47.

The upper, second spring seat retainer 45 comprises a mushroom element having head portion 52 and a stem portion 53. Head portion 52 defines an upper conical surface 54 having a tip 55. Stem portion 53 is received within the upper end 56 of the spring 43.

As only the tip 55 of the upper spring retainer is engaged by the lower surface 42 of the threaded stem 32, tendency of the threading of stem 32 to rotate the spring retainer is effectively minimized. Thus, force transmission from the force member 33 to the displacement reduction means 41 is effectively linear toward the midportion of beam 19. As the outlet ducts 27 in bonnet 12 are disposed closely adjacent the beam, the sliding surface 49 of the bonnet may be continuously cylindrical to provide effectively maximum guiding support for the lower spring retainer 44 thereby effectively maintaining the spring retainer tip 47 in accurate centered relationship to beam 19 in the different adjusted positions of the metering valve. Further, as tendency of the threaded force member 33 to rotate the displacement reduction means 41 is effectively eliminated, the transmission of deflection force from the force member 33 to the beam is maintained accurately centered on the beam at all times.

As indicated above, the orifice disc 21 comprises any one of a plurality of different such discs having different diameter ports 22. The selected orifice disc may be installed readily in the valve upon removal of bonnet 12 from the body. The orifice disc 21, spacer ring 20, beam 19, and displacement reduction means 41 may be installed in the lower end of the bonnet with the force member 33 retracted so that upon reinstallation of the bonnet 12 with these elements so assembled therein, the valve may be readily restored to the assembled relationship of FIG. 1.

By avoiding cocking of the displacement reduction means, accurate repeatable settings of the metering valve may be effected. It has been found that even slight displacement of the displacement reduction means relative to the beam may effect such repeatability and, thus, the improved, positive, centered slidable mounting of the spring retainer 44 in accurate maintained alignment with beam 19 provides a substantial improvement in such repeatability. Further, the effective elimination of a tendency to rotate the displacement reduction means as a result of rotation of the threaded force member 33 during manual adjustment of the valve provides further improved repeatability and facilitated accuracy in the metering functioning.

As indicated above, the same beam 19 may be utilized with a wide range of port sizes of the different orifice discs whereby facilitated selective use of the metering valve over a substantial range of desired flow control conditions may be readily obtained.

The foregoing disclosure of specific embodiments is illustrative of the broad invention concepts comprehended by the invention.

We claim:

1. In a metering valve having wall means defining a flow chamber, an inlet for conducting fluid to said chamber, and an outlet for conducting fluid from said chamber, a deflectible beam in said chamber, and adjustable means for adjustably deflecting said beam, the improvement comprising:

a selected orifice disc comprising any one of a plurality of orifice discs having different size orifices;

means associated with said wall means for securing the selected orifice disc in overlying relationship to said wall means at said inlet with the orifice thereof aligned with said inlet; and annular support means carried on said selected orifice for supporting said beam in accurate closely spaced relationship to said orifice, said adjustable means adjustably deflecting said beam toward said orifice to provide accurate metering of fluid flow from said inlet and orifice about said beam and through said chamber to said outlet, said wall means defining an annular recess coaxially of said inlet receiving the periphery of the selected disc in accurate coaxial relationshp to said inlet, and an annular portion coaxially inwardly of said recess and defining the inlet portion of said chamber snugly receiving said annular support means in accurate alignmnt with said inlet.

2. In a metering valve having wall means defining a flow chamber, an inlet for conducting fluid to said chamber, and an outlet for conducting fluid from said chamber, a deflectible beam spaced adjacent to said inlet, and adjustable means for adjustably deflecting said beam toward said inlet to provide metering of fluid flow from said inlet through said chamber to said outlet, the improvement comprising:

a selected orifice disc comprising any one of a plurality of orifice discs having different size orifices; and means associated with said wall means for securing the selected orifice disc in overlying relationship to said wall means at said inlet with the orifice thereof aligned with said inlet and with said beam spaced inwardly of said orifice, said beam being carried on said selected orifice in said chamber.

3. The metering valve of claim 2 wherein said beam is supported on a spacer ring carried on said selected orifice in said chamber.

4. The metering valve of claim 2 wherein said outlet opens to a portion of said chamber intermediate said adjustable means and said beam.

5. The metering valve of claim 2 wherein said outlet extends through said wall means laterally outwardly of said selected orifice disc in said chamber.

6. The metering valve of claim 2 wherein said adjustable means includes a spring and a spring seat urged by said spring against said beam to deflect the beam, said spring seat being cylindrical and being slidably carried in a complementary cylindrical bore of said wall means for accurate axial movement toward and from said beam in adjustably deflecting the same.

7. The metering valve of claim 2 wherein said outlet is disposed laterally adjacent said beam for receiving fluid flow from said chamber substantially adjacent said inlet.

8. In a metering valve having wall means defining a flow chamber, an inlet for conducting fluid to said chamber, and an outlet for conducting fluid from said chamber, a deflectible beam spaced adjacent to said inlet, and adjustable means for adjustably deflecting said beam toward said inlet to provide metering of fluid flow from said inlet through said chamber to said outlet, the improvement comprising:

a selected orifice disc comprising any one of a plurality of orifice discs having different size orifices; and means associated with said wall means for securing the selected orifice disc in overlying relationship to said wall means at said inlet with the orifice thereof aligned with said inlet and with said beam spaced inwardly of said orifice, said adjustable means including a coil spring axially aligned with said beam and having an end remote from said beam, a spring seat seating said remote spring end and having an outer conical surface, and threaded means carried by said wall means for engaging the tip of said conical surface to urge said spring seat adjustably toward said beam thereby to apply a deflecting force to said beam coaxially through said spring.

9. The metering valve of claim 8 further including a second spring seat at the opposite end of the spring engaging said beam, said second spring seat being cylindrical and being slidably carried in a complementary cylindrical bore of said wall means for accurate axial movement toward and from said beam in adjustably deflecting the same.

10. The metering valve of claim 8 wherein said adjustable means includes a first spring retainer defining a cylindrical recess receiving the end of said spring adjacent said beam, said retainer being urged by said spring against said beam, and said spring seat comprises a second spring retainer having a head portion and frustoconical stem slidably received in the opposite end of the spring, the frustoconical stem narrowing inwardly away from said head portion and having a maximum diameter at said head portion substantially equal to the inner diameter of the coil spring whereby the coil spring engages the second spring retainer substantially only adjacent said maximum diameter 11. The metering valve of claim 10 wherein said second spring retainer comprises a mushroom element having an enlarged head portion defining a conical surface engaged by said threaded means, and said head portion defining a flat surface opposite said conical surface extending perpendicularly to the axis of said stem at said portion of maximum diameter.

12. The metering valve of claim 10 wherein the outer surface of said first spring retainer is cylindrical and is slidably carried in a complementary cylindrical bore of said wall means for accurate axial movement toward and from said beam in adjustably deflecting the same.

13. The metering valve of claim 1 wherein said orifice disc extends across said flow chamber against a portion of said wall means defining said inlet and having an orifice aligned with said inlet, and a peripheral portion defining a portion of said wall means defining a portion of an outlet duct spaced from said flow chamber.

14. In a metering valve having wall means defining a flow chamber, an inlet for conducting fluid to said chamber, and an outlet for conducting fluid from said chamber, a deflectible beam spaced adjacent to said inlet, and adjustable means for adjustably deflecting said beam toward said inlet to provide metering of fluid flow from said inlet through said chamber to said outlet, the improvement comprising an orifice disc retained in said chamber against said wall means, said disc having an orifice aligned with said inlet, and a peripheral portion defining a portion of said outlet, said wall means including threadedly separable portions, said peripheral portion of the orifice means being clamped between said separable portions.

15. The metering valve of claim 14 wherein said outlet includes a first duct portion extending from said chamber through one of said separable portions, the other of said separable portions defining a second outlet duct portion, said separable portions and peripheral portion of the orifice disc cooperatively defining an annular transfer space for conducting fluid between said duct portions.

16. The metering valve of claim 14 wherein said outlet includes a first duct portion extending from said chamber through one of said separable portions, the other of said separable portions defining a second outlet duct portion, said separable portions and peripheral portion of the orifice disc cooperatively defining an annular transfer space laterally outwardly of said orifice disc peripheral portion for conducting fluid between said duct portions.

17. The metering valve of claim 13 wherein said outlet duct includes a portion extending from a portion of said chamber axially inwardly of said orifice disc peripheral portion to radially outwardly of said orifice disc for effectively minimized axial extent of said valve.

* * * * *